(12) United States Patent
Treybig et al.

(10) Patent No.: US 7,244,698 B2
(45) Date of Patent: Jul. 17, 2007

(54) VISCOELASTIC SURFACTANT COMPOSITION HAVING IMPROVED RHEOLOGICAL PROPERTIES AND METHOD OF USING FOR TREATING SUBTERRANEAN FORMATIONS

(75) Inventors: Duane S. Treybig, Sugar Land, TX (US); Grahame N. Taylor, Houston, TX (US); David Kelly Moss, Charlotte, NC (US)

(73) Assignee: Nalco Company, Naperville, IL (US)

( * ) Notice: Subject to any disclaimer, the term of this patent is extended or adjusted under 35 U.S.C. 154(b) by 258 days.

(21) Appl. No.: 10/903,581

(22) Filed: Jul. 30, 2004

(65) Prior Publication Data

US 2006/0025321 A1 Feb. 2, 2006

(51) Int. Cl.
*C11D 1/90* (2006.01)

(52) U.S. Cl. .................. 510/188; 510/490; 510/499; 510/477; 510/434

(58) Field of Classification Search ............... 510/188, 510/490, 499, 477, 434
See application file for complete search history.

(56) References Cited

U.S. PATENT DOCUMENTS

| | | | |
|---|---|---|---|
| 4,695,389 A | 9/1987 | Kubala | |
| 4,725,372 A | 2/1988 | Teot et al. | |
| 4,800,036 A | 1/1989 | Rose et al. | |
| 5,551,516 A | 9/1996 | Norman et al. | |
| 5,964,295 A | 10/1999 | Browne et al. | |
| 5,979,557 A | 11/1999 | Card et al. | |
| 6,107,352 A * | 8/2000 | Zofchak et al. | 424/401 |
| 6,156,712 A * | 12/2000 | Stringer et al. | 510/125 |
| 6,258,859 B1 | 7/2001 | Dahayanake et al. | |
| 6,306,800 B1 | 10/2001 | Samuel et al. | |
| 6,361,768 B1 * | 3/2002 | Galleguillos et al. | 424/70.12 |
| 6,412,561 B1 | 7/2002 | Brown et al. | |
| 6,435,277 B1 | 8/2002 | Qu et al. | |
| 6,455,058 B1 * | 9/2002 | Sun et al. | 424/401 |
| 6,506,710 B1 | 1/2003 | Hoey et al. | |
| 6,942,851 B2 * | 9/2005 | Fath et al. | 424/70.1 |
| 2003/0134751 A1 * | 7/2003 | Lee et al. | 507/200 |
| 2004/0067855 A1 | 4/2004 | Hughes et al. | |

FOREIGN PATENT DOCUMENTS

WO WO 01/18147 A1 3/2001

* cited by examiner

*Primary Examiner*—Charles Boyer
(74) *Attorney, Agent, or Firm*—Michael B. Martin; Thomas M. Breininger

(57) ABSTRACT

A viscoelastic surfactant composition having improved rheological performance comprising one or more quaternized amidoamine surfactants, one or more tertiary amine amides, one or more polymeric acids and one or more electrolytes, viscosified aqueous fluids comprising the surfactant composition and methods of making and using the viscosified aqueous fluid for treating subterranean formations.

41 Claims, No Drawings

VISCOELASTIC SURFACTANT COMPOSITION HAVING IMPROVED RHEOLOGICAL PROPERTIES AND METHOD OF USING FOR TREATING SUBTERRANEAN FORMATIONS

TECHNICAL FIELD

This invention relates to a viscoelastic surfactant composition having improved high temperature rheological performance for use in the treatment of subterranean formations. More particularly, a composition wherein a polymeric acid and a tertiary amine amide are used to enhance the viscosity of compositions comprising certain quaternized amidoamine surfactants.

BACKGROUND OF THE INVENTION

Hydraulic fracturing is used in the recovery of hydrocarbons from subterranean formations to fracture the formation and provide flow channels. These flow channels facilitate movement of the hydrocarbons to the wellbore so that the hydrocarbons may be pumped from the well.

In hydraulic fracturing operations, a fracturing fluid is hydraulically injected into a wellbore penetrating the subterranean formation and is forced against the formation strata at a pressure sufficient to crack and fracture the strata. The fracturing fluids are typically thickened or gelled aqueous compositions that also carry a proppant, which, when placed in the fracture by movement of the fracturing fluid containing proppant into the crack in the rock, "props" the fracture open, thereby providing improved flow of the hydrocarbon into the wellbore.

There has been considerable interest in using viscoelastic surfactants to increase the viscosity or induce gel formation in aqueous fracturing fluids. See, for example, U.S. Pat. Nos. 4,695,389, 4,725,372, 4,800,036, 5,551,516, 5,964,295, 5,979,557, 6,258,859, 6,306,800, 6,412,561, 6,435,277, 6,506,710 and PCT/US00/24142. It is believed that the viscoelastic surfactants form micelles that are able to viscosify the fluid and carry the proppant into the fractured rock. As oil is produced, it breaks the micelle, allowing the surfactants to be removed.

A viscoelastic surfactant composition comprising erucyl methyl bis(2-hydroxyethyl) ammonium chloride and a polymer and use of the composition in subterranean formations is disclosed in published U.S. Patent Application No. 20030134751.

There is, nonetheless, an ongoing need to develop new viscoelastic surfactant fracturing fluid compositions, particularly compositions having higher viscosity performance at low temperature and improved high temperature performance relative to existing technology, thereby allowing for the use of lower surfactant concentrations as well as enhanced ability to carry sand.

SUMMARY OF THE INVENTION

In an aspect, this invention is a viscoelastic surfactant composition comprising
(i) one or more quaternized amidoamine surfactants of formula I-IV, or a combination thereof

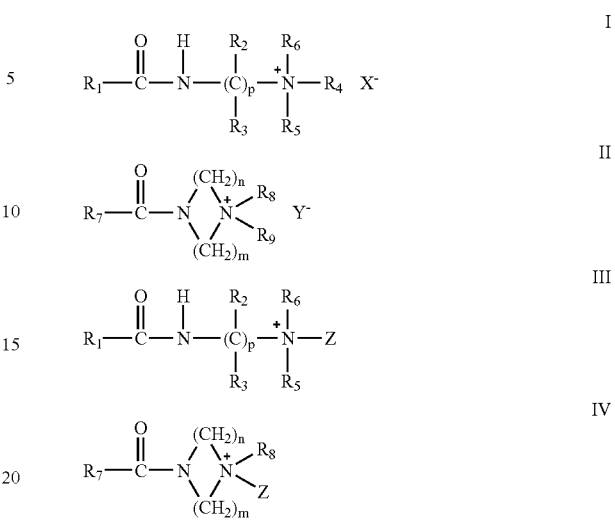

wherein $R_1$ and $R_7$ are independently selected from the group consisting of $C_{12}$-$C_{30}$ alkyl, $C_{12}$-$C_{30}$ alkenyl, $C_{12}$-$C_{30}$ arylalkyl and $C_{12}$-$C_{30}$ cycloalkylalkyl; $R_2$ and $R_3$ are independently selected at each occurrence from hydrogen and $C_1$-$C_4$ alkyl; $R_4$, $R_5$, $R_6$, $R_8$ and $R_9$ are independently selected from $C_1$-$C_4$ alkyl, $C_1$-$C_4$ alkoxyalkyl and $C_1$-$C_4$ hydroxyalkyl; X and Y are independently selected from halide, alkyl sulfate and sulfate; p is an integer from 1 to about 10; m and n are independently integers of 1 to about 4; Z is —$CH_2(CH_2)_qCH_2SO_3^-$ or —$CH_2CH(OH)CH_2SO_3^-$; and q is 1 or 2,
(ii) one or more tertiary amine amides of formula V or VI, or a combination thereof

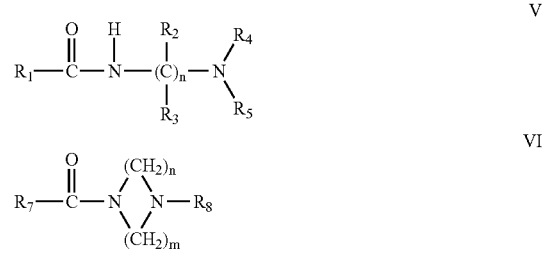

wherein $R_1$, $R_2$, $R_3$, $R_4$, $R_5$, $R_7$, $R_8$, p, m and n are as defined in step (i); and
(iii) one or more polymeric acids.

In another aspect, this invention is a viscosified aqueous surfactant composition comprising
(i) one or more quaternized amidoamine surfactants of formula I-IV, or a combination thereof

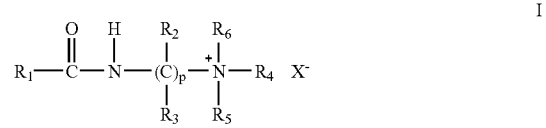

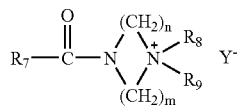

II

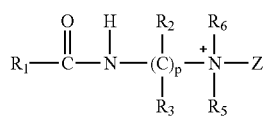

III

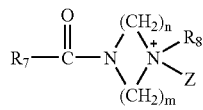

IV wherein $R_1$ and $R_7$ are independently selected from the group consisting of $C_{12}$-$C_{30}$ alkyl, $C_{12}$-$C_{30}$ alkenyl, $C_{12}$-$C_{30}$ arylalkyl and $C_{12}$-$C_{30}$ cycloalkylalkyl; $R_2$ and $R_3$ are independently selected at each occurrence from hydrogen and $C_1$-$C_4$ alkyl; $R_4$, $R_5$, $R_6$, $R_8$ and $R_9$ are independently selected from $C_1$-$C_4$ alkyl, $C_1$-$C_4$ alkoxyalkyl and $C_1$-$C_4$ hydroxyalkyl; X and Y are independently selected from halide, alkyl sulfate and sulfate; p is an integer from 1 to about 10; m and n are independently integers of 1 to about 4; Z is —$CH_2(CH_2)_qCH_2SO_3^-$ or —$CH_2CH(OH)CH_2SO_3^-$; and q is 1 or 2, (ii) one or more tertiary amine amides of formula V or VI, or a combination thereof

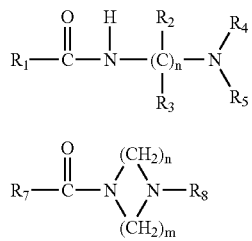

V

VI wherein $R_1$, $R_2$, $R_3$, $R_4$, $R_5$, $R_7$, $R_8$, p, m and n are as defined in step (i);
(iii) one or more polymeric acids; and
(iv) water.

In another aspect, this invention is a method of preparing a viscosified aqueous surfactant composition comprising adding one or more electrolytes to an aqueous surfactant composition comprising (i) one or more quaternized amidoamine surfactants of formula I-IV, or a combination thereof

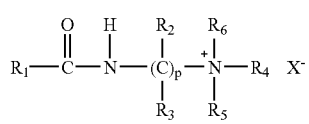

I

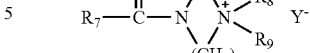

II

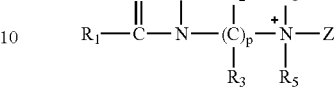

III

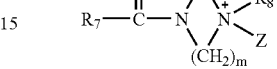

IV wherein $R_1$ and $R_7$ are independently selected from the group consisting of $C_{12}$-$C_{30}$ alkyl, $C_{12}$-$C_{30}$ alkenyl, $C_{12}$-$C_{30}$ arylalkyl and $C_{12}$-$C_{30}$ cycloalkylalkyl; $R_2$ and $R_3$ are independently selected at each occurrence from hydrogen and $C_1$-$C_4$ alkyl; $R_4$, $R_5$, $R_6$, $R_8$ and $R_9$ are independently selected from $C_1$-$C_4$ alkyl, $C_1$-$C_4$ alkoxyalkyl and $C_1$-$C_4$ hydroxyalkyl; X and Y are independently selected from halide, alkyl sulfate and sulfate; p is an integer from 1 to about 10; m and n are independently integers of 1 to about 4; Z is —$CH_2(CH_2)_qCH_2SO_3^-$ or —$CH_2CH(OH)CH_2SO_3^-$; and q is 1 or 2, (ii) one or more tertiary amine amides of formula V or VI, or a combination thereof

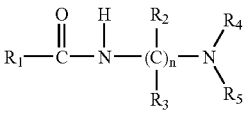

V

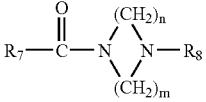

VI wherein $R_1$, $R_2$, $R_3$, $R_4$, $R_5$, $R_7$, $R_8$, p, m and n are as defined in step (i); and
(iii) one or more polymeric acids.

DETAILED DESCRIPTION OF THE INVENTION

Definitions of Terms

"Alcohol" means a straight or branched aliphatic hydrocarbon substituted by one hydroxy group. Representative alcohols include methanol, ethanol, propanol, isopropanol, butanol, 2-ethylhexanol, hexanol, octanol, decanol, and the like.

"Alkenyl" means a monovalent group derived from a straight or branched hydrocarbon containing at least one carbon-carbon double bond by the removal of a single hydrogen atom.

"Alkoxy" means a $C_1$-$C_4$ alkyl group attached to the parent molecular moiety through an oxygen atom. Representative alkoxy groups include methoxy, ethoxy, propoxy, butoxy, and the like. Methoxy and ethoxy are preferred.

"Alkyl" means a monovalent group derived from a straight or branched chain saturated hydrocarbon by the removal of a single hydrogen atom. Representative alkyl groups include methyl, ethyl, n- and iso-propyl, n-, sec-, iso- and tert-butyl, and the like.

"Alkyl sulfate" means a group of formula R'O—SO$_2$—O— wherein R' is $C_1$-$C_4$ alkyl. A preferred alkyl sulfate is methyl sulfate.

"Alkylene" means a divalent group derived from a straight or branched chain saturated hydrocarbon by the removal of two hydrogen atoms, for example methylene, 1,2-ethylene, 1,1-ethylene, 1,3-propylene, 2,2-dimethylpropylene, and the like.

"Alkylene oxide" means an aliphatic $C_2$ to $C_4$ epoxide, for example ethylene oxide, propylene oxide and butylene oxide.

"Aryl" means substituted and unsubstituted aromatic carbocyclic radicals and substituted and unsubstituted heterocyclic having from 5 to about 14 ring atoms. Representative aryl include phenyl naphthyl, phenanthryl, anthracyl, pyridyl, furyl, pyrrolyl, quinolyl, thienyl, thiazolyl, pyrimidyl, indolyl, and the like. The aryl is optionally substituted with one or more groups selected from hydroxy, halogen, $C_1$-$C_4$ alkyl and $C_1$-$C_4$ alkoxy.

"Arylalkyl" means an aryl group attached to the parent molecular moiety through an alkylene group. $C_{12}$-$C_{30}$ arylalkyl means an arylalkyl group where the number of carbon atoms in the aryl group and the alkylene group is selected such that there is a total of about 12 to about 30 carbon atoms in the arylalkyl group. $C_6$-$C_{18}$ arylalkyl means an arylalkyl group where the number of carbon atoms in the aryl group and the alkylene group is selected such that there is a total of about 6 to about 18 carbon atoms in the arylalkyl group.

"Carboxylate" means —$CO_2^-$.

"Cycloalkyl" means a monovalent group derived from a monocyclic or bicyclic saturated carbocyclic or heterocyclic ring compound by the removal of a single hydrogen atom. Representative cycloalkyl include cyclopropyl, cyclobutyl, cyclopentyl, cyclohexyl, bicyclo[2.2.1]heptanyl, piperazinyl, bicyclo[2.2.2]octanyl, homopiperazinyl, imidazolidinyl, and the like.

"Cycloalkylalkyl" means a cycloalkyl group attached to the parent molecular moiety through an alkylene group. The number of carbon atoms in the alkylene group is selected such that there is a total of about 12 to about 30 carbon atoms in the cycloalkylalkyl group.

"Diol" means a straight or branched aliphatic hydrocarbon substituted by two hydroxy groups. Representative diols include ethylene glycol, 1,2-propylene glycol, butylene glycol, 2-methyl-2,4-pentanediol, hexylene glycol, and the like.

"Halo" and "halogen" mean chlorine, fluorine, bromine and iodine.

"Hydroxyalkyl" means an alkyl group as defined herein substituted by one to three hydroxyl groups with the proviso that no more than one hydroxy group may be attached to a single carbon atom of the alkyl group. Representative hydroxyalkyl include hydroxyethyl, 2-hydroxypropyl, and the like.

"Salt" means the alkali or alkaline earth metal or ammonium salt of an inorganic or organic anionic counterion. Representative alkali or alkaline earth metals include sodium, lithium, potassium, calcium, magnesium, and the like. Representative anionic counterions include chloride, bromide, iodide, salicylate, toluenesulfonate, 3-hydroxy-2-naphthalenecarboxylate, cumene sulphonate, p- and m-chlorobenzoates, t-butyl and ethyl phenate, 2,5-dichlorophenate, 2,4,5-trichlorophenate, 2,3,5,6-tetrachlorophenate, p-methylphenate, m-chlorophenate, 3,5,6-trichloropicolinate, 4-amino-3,5,6-trichloropicolinate, 2,4-dichlorophenoxyacetate and the like.

"Sulfate" means —$OSO_3^{2-}$

"Sulfonate" means —$SO_3^-$.

PREFERRED EMBODIMENTS

The quaternized amidoamine surfactants (I) to (IV) of this invention are prepared by quaternization of tertiary amine amides of formula (V) and (VI). In cases where X or Y is halide, the tertiary amine amide (V) or (VI) is dissolved in a $C_1$-$C_4$ alcohol or diol and quaternized with about 1 to about 1.5 molar equivalents of a $C_1$-$C_5$ alkyl halide, preferably about 1.1 to about 1.3 molar equivalents of methyl chloride, at a temperature of about 30° C. to about 120° C. for about 6 to about 27 hours to form the quaternized amidoamine surfactant (I) or (II).

When X or Y is methyl sulfate, the tertiary amine amide (V) and (VI) is dissolved in a suitable solvent, such as an $C_1$-$C_4$ alcohol or diol and quaternized with about 1 to about 1.5 molar equivalents of a dimethyl sulfate, preferably about 1.0 to about 1.1 molar equivalents of dimethyl sulfate at reflux temperature to form the quaternized amido cyclic amine surfactant.

Isopropanol, propylene glycol and methanol are the preferred solvents for the quaternization as they exhibit the best ability at solubilizing the quaternary salt by breaking the gel phase formed. Isopropanol and propylene glycol are preferred over methanol because of the toxicity issues associated with use of methanol. We have also discovered that propylene glycol improves the viscosity performance of the surfactant composition of this invention at higher temperatures relative to isopropanol.

Amidoamine surfactants of formula (III) and (IV) where Z is —$CH_2CH_2CH_2SO_3^-$ can be prepared by reacting tertiary amine amides (V) and (VI) with about 1 to about 1.5, preferably about 1.0 to about 1.1 molar equivalents of 1,3-propane sultone in water or any other suitable solvent at a temperature of about 25° C. to 95° C. for about 10 minutes to about 8 hours.

Amidoamine surfactants of formula (III) and (IV) where Z is —$CH_2(CH_2)_2CH_2SO_3^-$ can be prepared by reacting tertiary amine amides (V) and (VI) with about about 1 to about 1.6 molar equivalents of 1,4-butane sultone either neat or in a suitable solvent such as ethylene dichloride. When the reaction is carried out neat it is generally carried out at about 120° C. to about 250° C., preferably about 160° C. to about 190° C. with a catalyst. When the reaction is carried out with a solvent, the contents are heated at reflux.

Amidoamine surfactants of formula (III) and (IV) where Z is —$CH_2CH(OH)CH_2SO_3^-$ can be prepared by reacting tertiary amine amides (V) and (VI) with about 1 to about 1.8 molar equivalents of the sodium salt of 3-chloro-2-hydroxy-1-propanesulfonic acid in a suitable solvent at reflux temperature. Representative solvents include water, alcohols, diols and their blends. A catalyst such as sodium hydroxide can be used to enhance the reaction. See U.S. Pat. No. 4,853,138.

Tertiary amine amides (V) and (VI) are prepared by condensing an acyl halide, ester or carboxylic acid of formula $R_1C(O)Z$ or $R_7C(O)Z$ wherein $R_1$ and $R_7$ are defined herein and Z is hydroxyl, halogen or alkoxy with a N,N-dialkyl alkylenediamine of formula (VII) or a N-alkyl cyclic diamine of formula (VIII) wherein $R_2$, $R_3$, $R_4$, $R_5$, $R_8$, n and m are defined herein.

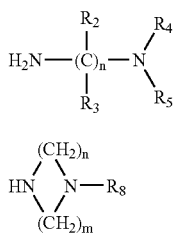

Preferably, the N,N-dialkyl alkylenediamine or N-alkyl cyclic diamine is reacted with about 1.0 to about 1.1 molar equivalents of the fatty carboxylic acid, ester or acid choride at a temperature of about 60° C. to about 180° C. for about 1 to about 30 hours. In cases where Z is alkoxy, the reaction is preferably conducted in the presence of a base such as sodium methoxide. Where Z is hydroxy, the reaction is preferably done in the absence of solvent.

Representative N-alkyl cyclic diamines (VIII) include 1-methylpiperazine, 1-ethylpiperazine, 1-(2-hydroxyethyl)piperazine, 1-(2-hydroxypropylpiperazine), 1-benzylpiperazine, 1-methylimidazolidine, 1-methyl-homopiperazine (hexahydro-1-methyl-1H-1,4-diazepine), 1-ethyl-homopiperazine and the like and mixtures thereof.

Representative N,N-dialkyl alkylenediamines include 3-(dimethylamino)propylamine; 3-(diethylamino)propylamine; N,N,N',N'-tetramethyl-1,3-propanediamine; N,N-dimethylethylenediamine; N,N-diethylethylenediamine; N,N-dimethylbutanediamine; N,N-dimethyl-1,6-hexanediamine; N,N-bis(2-hydroxyethyl)ethylenediamine; N,N,N'-trimethylethylenediamine; N,N,N'-trimethyl-1,3-propanediamine; N,N-dimethyl-N'-ethylethylenediamine; and N,N,N'-triethylethylenediamine.

The carboxylic acids, esters or acid chlorides may be saturated and unsaturated and contain between 12 to 30 carbons exclusive of the alkoxy group of the ester. Alkyl and alkenyl groups may be straight chain or branched.

Representative unsaturated carboxylic acids $R_1$- or $R_7CO_2H$ include 6-octadecenoic acid (oleic acid, $C_{18}$); 9,11,13-octadecatrienoic acid ($C_{18}$); 12-hydroxy-9-octadecenoic acid ($C_{18}$); 5,8,11,14-eicosatetraenoic acid ($C_{20}$); eicosenoic acid ($C_{20}$); heneicosenoic acid ($C_{21}$); 13-docosenoic acid (erucic acid, $C_{22}$); tetracosenoic acid ($C_{24}$); pentacosenoic acid ($C_{25}$), heptacosenoic acid ($C_{27}$); and the like and mixtures thereof.

Representative saturated carboxylic acids $R_1$- or $R_7CO_2H$ include eicosanoic acid ($C_{20}$); heneicosanoic acid ($C_{21}$); docosanoic acid (behenic acid, $C_{22}$); tricosanoic acid ($C_{23}$); tetracosanoic acid ($C_{24}$); pentacosanoic acid ($C_{25}$); heptacosanoic acid ($C_{27}$); and the like and mixtures thereof.

Representative branched unsaturated and saturated acids $R_1$- or $R_7CO_2H$ include 3-methylhexadecanoic acid; 7-methylhexadecanoic acid; 13-methylhexadecanoic acid; 14-methyl-11-eicosenoic acid; 2-hydroxy-18-oxa-19-methyl-4-eicosenoic acid; and the like and mixtures thereof.

Representative alkyl esters of saturated and unsaturated acids $R_1$- or $R_7CO_2R'$ include 2-methylhexadecanoic acid methyl ester; 8-ethyl-9-methylhexadecanoic acid methyl ester; 18-methyl-15-eicosenoic acid methyl ester; 14-methyl-11-eicosenoic acid methyl ester; 9,12,15-octadecatrienoic acid methyl ester; docosanoic acid methyl ester; and the like and mixtures thereof.

Acid chlorides of saturated and unsaturated acids $R_1$- or $R_7COCl$ include include oleoyl chloride, octadecanoyl chloride, docosanoyl chloride, eicosanoyl chloride, 9-tetracosenoyl chloride, 15-tetracosenoyl chloride, and the like and mixtures thereof.

In general, a higher viscosity formulation is obtained when the hydrophobic portion of the surfactant molecule contains more than about 15 carbon atoms, preferably more than about 18 carbon atoms and more preferably more than about 21 carbon atoms and up to about 30 carbon atoms. As used herein "hydrophobic portion" means the portion of the surfactant that does not contain quaternary or zwitterionic functionality.

In a preferred aspect of this invention, $R_1$ and $R_7$ are independently selected from the group consisting of $C_{15}$-$C_{30}$ alkyl and $C_{12}$-$C_{30}$ alkenyl.

In another preferred aspect, $R_1$ and $R_7$ are independently selected from the group consisting of $C_{15}$-$C_{30}$ alkenyl.

In another preferred aspect, $R_1$ and $R_7$ are independently selected from the group consisting of $C_{18}$-$C_{30}$ alkenyl.

In another preferred aspect, $R_1$ and $R_7$ are independently selected from the group consisting of $C_{22}$-$C_{30}$ alkenyl.

In another preferred aspect, p is an integer of 2 to about 6 and m and n are both 2.

In another preferred aspect, $R_1$ and $R_7$ are independently selected from the group consisting of $C_{18}$-$C_{30}$ alkenyl; $R_2$ and $R_3$ are hydrogen; $R_4$, $R_5$, $R_6$, $R_8$ and $R_9$ are independently selected from $C_1$-$C_2$ alkyl, $C_2$-$C_3$ hydroxyalkyl and $C_6$-$C_8$ arylalkyl; p is an integer of 2 or 3; m and n are both 2 and X and Y are independently selected from Cl and $CH_3O$—$SO_2$—O—.

In another preferred aspect, $R_6$ and $R_8$ are methyl and $R_4$, $R_5$ and $R_9$ are independently selected from the group consisting of methyl, ethyl and hydroxyethyl.

In another preferred aspect, $R_4$, $R_5$ and $R_9$ are methyl.

In another preferred aspect, p is 2.

One or more polymeric acids are included in the composition to cause an increase in the fluid viscosity. As used herein, "polymeric acid" means a polymeric backbone functionalized with one or more pendant carboxylic (—$CO_2H$) or sulfonic acid (—$SO_3H$) groups or salts thereof. Representative polymeric acids include sulfonated polystyrenes, sulfonated polynaphtalenes, sulfonated styrene/maleic anhydride polymers, polyacrylic acid, polymethacrylic acid, poly acrylic methacrylic acid polymers, and the like. The polyacid can be in the free acid form or a salt form, preferably a sodium salt form.

The polymeric acids have a molecular weight (Mw) of at least about 25,000, preferably at least about 75,000. Preferred polymeric acids include sulfonated polystyrene and salts thereof and polyacrylic acid and salts thereof. Representative preferred polymeric acids include Mw 75,000 sulfonated polystyrene acid, 75,000 Mw sodium salt of sulfonated polystyrene, Mw 1,000,000 sodium salt of sulfonated polystyrene, available from ALCO Chemical, Chattanooga, Tenn. under the tradenames Versa TL-71, Versa TL-77 and Versa TL-501, respectively, and 250,000 Mw polyacrylic acid, available from Nalco Company, Naperville, Ill.

A more preferred polymeric acid is sulfonated polystyrene having a molecular weight of at least about 75,000.

In order to activate the production of viscoelasticity, one or more electrolytes are added to the mixture of quaternized surfactant, tertiary amine amide and polymeric acid. Suitable electrolytes include organic and inorganic salts of ammonia and monovalent cations such as sodium and potassium. Preferred inorganic salts include ammonium chloride, potassium chloride and mixtures thereof. Preferred organic salts include alkali or alkaline-earth salts of salicylic acid, toluene sulphonate, 3-hydroxy-2-napthalenecarboxylate, cumene sulphonate, and the like. Preferably the alkali or alkaline earth metal is a monovalent cation such as sodium. A more preferred organic salt is sodium salicylate.

The quaternized amidoamine surfactants, tertiary amine amides, polymeric acids and electrolytes are formulated with alcohols, glycols and water to provide a viscosified aqueous solution. Alcohol solvents are preferably glycols and $C_1$-$C_8$ alcohols. Representative $C_1$-$C_8$ alcohols include methanol, isopropanol, n-propanol, butanol, 2-ethylhexanol, and the like, and mixtures thereof. Representative glycols include ethylene glycol, 1,2-propylene glycol, butylene glycol, 2-methyl-2,4-pentanediol, hexylene glycol, ethylene glycol butyl ether, and the like, and mixtures thereof. The alcohol and glycol also help solubilize the surfactant in water. The quaternized amidoamine surfactants, tertiary amine amides and polymeric acids are preferably formulated in a water, isopropanol, 1,3-propylene glycol mixture. Surprisingly, water helps drop the pour point of the above composition formulated in alcohols and glycols.

Fluid viscosity depends on the molecular weight and concentration of the polymeric acids. If the concentration is too high or the polymeric acids have a molecular weight below about 25,000, the polymers can decrease the viscosity, thereby acting as breakers. The polymeric acids are used at a concentration that provides an improvement in viscosity. The exact concentration depends on the polymeric acid and molecular weight. In general, the concentration of the polymeric acid component varies from about 0.03 to above 7 weight percent of the formulated surfactant. Lower concentration is preferred to give a clear gelled fluid that exhibits better conductivity through the formation rock and better conductivity through the formation rock after "breaking."

In a preferred aspect of this invention, the surfactant composition comprises (a) about 25 to about 80 weight percent of a surfactant mixture comprising (a1) about 65 to about 99.4 weight percent of the quaternized amidoamine surfactants of formula I-IV, or a combination thereof, (a2) about 0.5 to about 20 weight percent of the tertiary amine amides of formula V or VI, or a combination thereof and (a3) about 0.1 to about 15 weight percent of the polymeric acid; and (b) about 20 to about 75 weight percent of a solvent system comprising (b1) about 0 to about 10 weight percent water, (b2) about 0 to about 45 weight percent of one or more alcohols and (b3) about 0 to about 45 weight percent of one or more glycols.

In another preferred aspect, the surfactant composition comprises (a) about 55 to about 65 weight percent of a surfactant mixture comprising (a1) about 65 to about 99.4 weight percent of the quaternized amidoamine surfactants of formula I-IV, or a combination thereof, (a2) about 0.5 to about 20 weight percent of the tertiary amine amides of formula V or VI, or a combination thereof and (a3) about 0.1 to about 15 weight percent of the polymeric acid; and (b) about 35 to about 45 weight percent of a solvent system comprising (b1) about 0 to about 10 weight percent water, (b2) about 0 to about 45 weight percent isopropanol and (b3) about 0 to about 45 weight percent glycol.

In another preferred aspect, the solvent system comprises about 0 to about 5 weight percent water, about 20 to about 35 weight percent isopropanol and about 0 to about 35 weight percent 1,3-propane diol.

In another preferred aspect, the solvent system comprises about 3 to about 5 weight percent water, about 20 to about 22 weight percent isopropanol and about 8 to about 12 weight percent 1,3-propane diol.

As noted above, one or more electrolytes are added to the amidoamine surfactant(s), tertiary amine amide(s) and polymeric acids in order to activate the production of viscoelasticity. The electrolytes can be pre-blended with the quaternized amidoamine surfactant(s), tertiary amine amide(s) and polymeric acid(s) to form a viscosified surfactant composition. Preferably, the electrolyte(s) and any additional solvents are added as a separate ingredient to the blend of the tertiary amine amide(s), quaternized amidoamine surfactant(s) and polymeric acid(s) in solvents at the well site.

In a preferred aspect, this invention is a viscosified aqueous surfactant composition comprising
(I) about 1 to about 10 weight percent of a surfactant composition comprising (a) about 20 to about 75 weight percent of a surfactant mixture comprising (a1) about 65 to about 99.4 weight percent of the quaternized amidoamine surfactants of formula I-IV, or a combination thereof, (a2) about 0.5 to about 20 weight percent of the tertiary amine amides of formula V or VI, or a combination thereof and (a3) about 0.1 to about 15 weight percent of the polymeric acid; and (b) about 20 to about 75 weight percent of a solvent system comprising (b1) about 0 to about 10 weight percent water, (b2) about 0 to about 45 weight percent of one or more alcohols and (b3) about 0 to about 45 weight percent of one or more glycols;
(II) about 0.4 to about 20 weight percent of one or more electrolytes; and
(III) about 80 to about 98.5 weight percent water.

In another preferred aspect, the alcohol is isopropanol and the glycol is 1,3-propane diol.

In another preferred aspect, the viscosified aqueous surfactant composition comprises about 0.4 to about 5 weight percent of one or more electrolytes.

In another preferred aspect, this invention is a viscosified aqueous surfactant composition comprising
(I) about 1 to about 10 weight percent of a surfactant composition comprising (a) about 55 to about 65 weight percent of a surfactant mixture comprising (a1) about 65 to about 99.4 weight percent of the quaternized amidoamine surfactants of formula I-IV, or a combination thereof, (a2) about 0.5 to about 20 weight percent of the tertiary amine amides of formula V or VI, or a combination thereof and (a3) about 0.1 to about 15 weight percent of the polymeric acid; and (b) about 35 to about 45 weight percent of a solvent system comprising (b1) about 0 to about 10 weight percent water, (b2) about 0 to about 45 weight percent isopropanol and (b3) about 0 to about 45 weight percent 1,3-propane diol;
(II) about 0.4 to about 5 weight percent of one or more electrolytes; and
(III) about 80 to about 98.5 weight percent water.

In another preferred aspect, this invention is a viscosified aqueous surfactant composition comprising
(I) about 1 to about 10 weight percent of a surfactant composition comprising (a) about 55 to about 65 weight percent of a surfactant mixture comprising (a1) about 84 to about 96.6 weight percent of the quaternized amidoamine surfactants of formula I-IV, or a combination thereof, (a2) about 3 to about 11 weight percent of the tertiary amine amides of formula V or VI, or a combination thereof and (a3) about 0.4 to about 5 weight percent of the polymeric acid; and (b) about 35 to about 45 weight percent of a solvent system comprising (b1) about 0 to about 10 weight percent water, (b2) about 0 to about 45 weight percent isopropanol and (b3) about 0 to about 45 weight percent 1,3-propane diol;

(II) about 1 to about 5 weight percent of one or more electrolytes; and (III) about 80 to about 98.5 weight percent water.

In another preferred aspect, this invention is a viscosified aqueous surfactant composition comprising (I) about 1 to about 10 weight percent of a surfactant composition comprising (a) about 55 to about 65 weight percent of a surfactant mixture comprising (a1) about 88 to about 92.6 weight percent of the quaternized amidoamine surfactants of formula I-IV, or a combination thereof, (a2) about 7 to about 11 weight percent of the tertiary amine amides of formula V or VI, or a combination thereof and (a3) about 0.4 to about 2 weight percent of the polymeric acid; and (b) about 35 to about 45 weight percent of a solvent system comprising (b1) about 0 to about 10 weight percent water, (b2) about 0 to about 45 weight percent of isopropanol and (b3) about 0 to about 45 weight percent of one or more 1,3-propane diol;

(II) about 1 to about 5 weight percent of one or more electrolytes; and (III) about 80 to about 98.5 weight percent water.

The viscosified aqueous surfactant composition of this invention is used in well treatment applications including drilling, hydraulic fracturing, gravel placement, scale removing and mud cake removing operations.

The viscosified aqueous surfactant composition is particularly useful for carrying proppant into subterranean formations during hydraulic fracturing of the formation.

In hydraulic fracturing of subterranean formations, a fracturing fluid is injected through a wellbore penetrating the formation and is forced against the formation by pressure, forcing the formation strata or rock to crack and fracture. A particulate proppant is then placed in the fracture to prop open the fracture and provide improved flow of oil, gas or water into the wellbore.

Accordingly, in a preferred aspect, the viscosified aqueous surfactant composition further comprises one or more particulate proppants.

Suitable particulate proppant materials are insoluble in the fluids contained in the subterranean formation and include sand, bauxite, walnut shells, glass beads, polystyrene beads and the like.

In general, the viscosified aqueous surfactant composition comprises about 0.5 pound to about 8 pound per gallon of the proppant, but may comprise up to 22 pounds or more of proppant in certain instances.

The fracturing fluid may contain other components conventional in the art including gases such as air, nitrogen or carbon dioxide to provide an energized fluid or a foam. Other conventional ingredients such as corrosion inhibitors, fluid-loss additives, and the like may also be included.

Other commonly used fracturing fluids are based on polysaccharides, such as guar. A disadvantage of the polysaccharide viscosifiers is that they contain materials that concentrate in the formation during the course of the hydraulic fracturing treatment, damaging the formation (reducing the porosity) and reducing the production of hydrocarbons after the fracturing event.

A key aspect of well treatment such as hydraulic fracturing is the "clean-up" i.e. removing the carrier fluid from the fracture after the treatment has been completed. Techniques for promoting fracture cleanup often involve reducing the viscosity of the fracturing fluid as much as practical so that it will readily flow back towards the wellbore. The viscosity of the viscoelastic composition is reduced or lost upon exposure to formation fluids such as crude oil, condensate and/or water. Usually, more viscosity is lost upon exposure to oil than condensate or gas. Therefore, it is often favorable to add a breaker to reduce the viscosity further, especially when the production is primarily condensate or dry gas. Because the viscoelastic surfactant composition of this invention is a more complex morphlogy than rod-like micelles, a breaker is even more necessary to obtain the proper conductivity through the formation rock.

Accordingly, in another preferred aspect, the gelled aqueous composition further comprises one or more breakers.

Breakers are components that can decrease the fluid viscosity of the viscosified aqueous surfactant composition of this invention.

In a preferred aspect of this invention, the breaker is a blend of polypropylene glycol, oleic acid and potassium oleate.

In another preferred aspect, the breaker is polypropylene glycol.

In another preferred aspect, the breaker is a blend of oxone.

In another preferred aspect, the breaker is an oxidizer.

In another preferred aspect, the oxidizer is sodium persulfate, sodium perchlorate, ammonium persulfate, potassium perchlorate, sodium permanganate monohydrate or ammonium perchlorate.

In another preferred aspect, the breaker is a poly(acrylic acid-2-acrylamido-2-methylpropanesulfonic acid).

In another preferred aspect, the breaker is oleic acid.

In another preferred aspect, the breaker is selected from sulfonated polystyrene, sulfonated polynapthalene, and sulfonated styrene-maleic anhydride polymers.

In another preferred aspect, the breaker is selected from polyacrylic acid, polymethacrylic acid and acrylic acid-methacrylic acid copolymer.

In another preferred aspect, the breaker is selected from ethoxylated nonylphenol formaldehyde resins and ethoxylated nonyl and di-nonyl phenol formaldehyde resins.

The breakers can be dissolved or suspended in the liquid phase of the treating fluid and exposed to the polymer throughout the treatment. This is called an "internal" breaker. The breaker can also be exposed to the fluid at some time period after the treatment. Then it is call an "external" breaker. The most common external methods and compositions involved encapsulated breakers or involve the use of pre- or post-flushes that contain breakers. Breaking can occur in the wellbore, gravel pack, filter cake, the rock matrix, in a fracture, or in another environment.

Several mechanisms are typically involved in the release of the encapsulated material. These mechanisms typically involve partial dissolution of the capsule enclosures by osmotic or chemical diffusion. However, since it is suitable that the breaking occur no later than at the end of the fracturing operation, when the fracture closes due to formation pressure, a key mechanism is the release of the breaking agent through the rupture of the enclosure or encapsulating coating. Obviously, the bigger the capsules, the higher their probability of being crushed during the fracture closure. On the other hand, the encapsulated breaker has to be pumped downhole and therefore, as a rule, the size of the capsules of breakers is chosen similar to the size of the proppant. Usually the breaker material is in granular or powder form with sufficient strength to survive the encapsulating process.

Coating material can be from aqueous and organic solutions, dispersions and hot melts. Some examples include acrylics, halocarbon, polyvinyl alcohol, polyvinylacetate phthalate, polyvinylidene chloride, Kynar, fluoroplastics, rubber, Aquacoat® aqueous dispersions, Aquateric® enteric coatings, Coateric® coatings, Daran® latex, Opadry® coating systems, dextrins, Surelease® coating systems, polymethacrylates, vinyl alcohol copolymer, waxes and the like.

The methods and composition in this invention is focused on fracturing oil and gas wells, but can also be used as an acid diverter in stimulation. Other applications include, use in water wells, recovery of coalbed methane, and the containment of ground or groundwater contamination.

The foregoing may be better understood by reference to the following examples, which are presented for purposes of illustration and are not intended to limit the scope of this invention. Unless otherwise indicated, percent and % refer to weight percents.

EXAMPLE 1

4-Erucamidopropyl-1,1-dimethyl amine

Four drums of erucic acid (1588 lbs) are melted and charged to a 500 gallon titanium reactor. The acid is stripped at a temperature up to 100° C. for 2 hours. A total of 584 lbs of dimethylaminopropylamine is then added and allowed to react with the acid for 48 hours. The by-product water and excess dimethylaminopropylamine are removed in vacuo at a temperature up to 165° C. for a total of 5 hours. The product, 4-erucamidopropyl-1,1-dimethyl amine, is measured to be 98.8% converted. The product is carried through to the quaternization in entirety.

EXAMPLE 2

4-Erucamidopropyl-1,1,1-trimethyl ammonium chloride

To the reactor containing the 4-erucamido-1,1-dimethyl amine prepared in Example 1 is added 600 lbs of isopropanol. A total of 217 lbs of methyl chloride is then added to the reactor and allowed to react over a 22 hour period at a temperature up to 113° C. Once the reaction with methyl chloride terminates, the reactor is cooled and stripped to remove any residual methyl chloride. Titration analysis indicates the amidoamine is 98.2% converted to the title compound. The product is titrated to be 75.6% actives in isopropyl alcohol.

EXAMPLE 3

Blending of 4-erucamidopropyl-1,1-dimethyl amine and 4-erucamidopropyl-1,1,1-trimethyl ammonium chloride Different amounts of 4-Erucamidopropyl-1,1-dimethylamine (tertiary amine amide) is blended with 4-erucamidopropyl-1,1,1-trimethyl ammonium chloride as shown in Table 1.

TABLE 1

Blending 4-Erucamidopropyl-1,1-dimethyl amine and 4-Erucamidopropyl-1,1,1-trimethyl ammonium chloride.

|  | 3a | 3b | 3c | 3d | 3e |
|---|---|---|---|---|---|
| Material from Ex. 2 | 98.2 g | 96.5 g | 95.0 g | 91.0 g | 89.2 g |
| Material from Ex. 1 | 1.8 g | 3.5 g | 5.0 g | 9.0 g | 10.8 g |
| % Tertiary amine amide | 1.8% | 3.5% | 5.0% | 9.0% | 10.8% |

The blends are placed in an oven at 60° C. for 30 minutes and then agitated by hand for a few minutes.

EXAMPLE 4

Aqueous 59 weight percent 4-erucamidopropyl-1,1,1-trimethyl ammonium chloride, 26 weight percent isopropanol, 10 weight percent 1,2-propanediol 5 weight percent water solution A portion (77.64 g) of the surfactant composition from Example 2, 1,2-propanediol (10.0 g), isopropanol (7.37 g) and water (5.01 g) are blended and then warmed in an oven at about 80° C. for about 30 minutes. The contents are then agitated by hand to obtain the title composition as homogeneous solution.

EXAMPLE 5

Viscosified aqueous 4 weight percent 4-erucamidopropyl-1,1,1-trimethyl ammonium chloride, 1.76 weight percent isopropanol, 0.677 weight percent 1,2-propanediol, 4.0 weight percent potassium chloride solution A portion (14.92 g) of the surfactant composition from Example 4 is blended with water (179.61 g) for 2 minutes. Potassium chloride (8.85 g) and additional water (16.83 g) is added and the contents are blended for 2 more minutes to give the title composition as a viscous solution.

EXAMPLE 6

Aqueous 58 weight percent 4-erucamidopropyl-1,1,1-trimethyl ammonium chloride, 1.1 weight percent 4-erucamidopropyl-1,1-dimethyl amine, 26 weight percent isopropanol, 10 weight percent 1,2-propanediol solution A portion (10 g) of the surfactant composition from Example 3a, 1,2-propanediol (10.0 g), isopropanol (7.4 g) and water (5.0 g) are blended and then warmed in an oven at about 80° C. for about 30 minutes to give the title composition.

EXAMPLE 7

Viscosified aqueous 4 weight percent 4-erucamidopropyl-1,1,1-trimethyl ammonium chloride and 4-erucamidopropyl-1,1-dimethylamine, 1.76 weight percent isopropanol, 0.677 weight percent 1,2-propanediol and 4.0 weight percent potassium chloride solution A portion (14.9 g) of the surfactant composition from Example 6, and water (180.4 g) is blended for 2 minutes. Potassium chloride (8.9 g) and additional water (15.8 g) is added and the contents are blended for 2 more minutes to give the title composition as a viscous solution.

EXAMPLE 8

Aqueous 56.9 weight percent
4-erucamidopropyl-1,1,1-trimethyl ammonium
chloride, 2.1 weight percent
4-erucamidopropyl-1,1-dimethyl amine, 26 weight
percent isopropanol, 10 weight percent
1,2-propanediol solution A portion (76.6 g) of the surfactant composition from Example 3b, 1,2-propanediol (10.0 g), isopropanol (8.4 g) and water (5.0 g) are blended and then warmed in an oven at about 80° C. for about 30 minutes to give the title composition.

EXAMPLE 9

Viscosified aqueous 4 weight percent
4-erucamidopropyl-1,1,1-trimethyl ammonium
chloride and 4-erucamidopropyl-1,1-dimethylamine,
1.76 weight percent isopropanol, 0.68 weight
percent 1,2-propanediol and 4.0 weight percent
potassium chloride solution A portion (14.9 g) of the blend surfactant composition from Example 8, and water (183.7 g) is blended for 2 minutes. Potassium chloride (8.8 g) and additional water (12.7 g) is added and the contents are blended for 2 more minutes to give the title composition as a viscous solution.

EXAMPLE 10

Aqueous 56.0 weight percent
4-erucamidopropyl-1,1,1-trimethyl ammonium
chloride, 3.0 weight percent
4-erucamidopropyl-1,1-dimethyl amine, 26.0 weight
percent isopropanol, 10 weight percent
1,2-propanediol solution A portion (76.6 g) of the surfactant composition from Example 3c, 1,2-propanediol (10.0 g), isopropanol (8.4 g) and water (5.1 g) are blended and then warmed in an oven at about 80° C. for about 30 minutes to give the title composition blend.

EXAMPLE 11

Viscosified aqueous 4 weight percent
4-erucamidopropyl-1,1,1-trimethyl ammonium
chloride and 4-erucamidopropyl-1,1-dimethylamine,
1.76 weight percent isopropanol, 0.68 weight
percent 1,2-propanediol and 4.0 weight percent
potassium chloride solution A portion (14.9 g) of the surfactant composition from Example 10, and water (180.6 g) is blended for 2 minutes. Potassium chloride (8.8 g) and additional water (15.9 g) is added and the contents are blended for 2 more minutes to give the title composition as a viscous solution.

EXAMPLE 12

Aqueous 53.7 weight percent
4-erucamidopropyl-1,1,1-trimethyl ammonium
chloride, 5.3 weight percent
4-erucamidopropyl-1,1-dimethyl amine, 26 weight
percent isopropanol, 10 weight percent
1,2-propanediol solution A portion (75.6 g) of the surfactant composition from Example 3d, 1,2-propanediol (10.0 g), isopropanol (9.4 g) and water (5.1 g) are blended and then warmed in an oven at about 80° C. for about 30 minutes to give the title composition.

EXAMPLE 13

Viscosified aqueous 4 weight percent
4-erucamidopropyl-1,1,1-trimethyl ammonium
chloride and 4-erucamidopropyl-1,1-dimethylamine,
1.77 weight percent isopropanol, 0.68 weight
percent 1,2-propanediol and 4.0 weight percent
potassium chloride solution A portion (15.0 g) of the surfactant composition from Example 12, and water (183.1 g) is blended for 2 minutes. Potassium chloride (8.8 g) and additional water (13.2 g) is added and the contents are blended for 2 more minutes to give the title composition as a viscous solution.

EXAMPLE 14

Aqueous 52.7 weight percent
4-erucamidopropyl-1,1,1-trimethyl ammonium
chloride, 6.3 weight percent
4-erucamidopropyl-1,1-dimethyl amine, 26.0 weight
percent isopropanol, 10 weight percent
1,2-propanediol solution A portion (74.7 g) of the surfactant composition from Example 3e, 1,2-propanediol (10.0 g), isopropanol (10.3 g) and water (5.0 g) are blended and then warmed in an oven at about 80° C. for about 30 minutes to give the title composition.

EXAMPLE 15

Viscofied aqueous 4 weight percent
4-erucamidopropyl-1,1,1-trimethyl ammonium
chloride and 4-erucamidopropyl-1,1-dimethylamine,
1.76 weight percent isopropanol, 0.68 weight
percent 1,2-propanediol and 4.0 weight percent
potassium chloride solution A portion (14.9 g) of the surfactant composition from Example 14, and water (180.5 g) is blended for 2 minutes. Potassium chloride (8.8 g) and additional water (15.8 g) are added and the contents are blended for 2 more minutes to give the title composition as a viscous solution.

The viscosity of material from examples 5, 7, 9 and 11 is determined between 73° F. and 254° F. with a Fann 50 Rheometer equipped with a B5 bob at a shear rate of 100 $sec^{-1}$ (118 RPM). The results are shown in Table 2.

TABLE 2

| Example 5 | | Example 7 1.8 wt. % tertiary amine amide | | Example 9 3.5 wt. % tertiary amine amide | | Example 11 5.0 wt. % tertiary amine amide | |
|---|---|---|---|---|---|---|---|
| Viscosity (100 sec$^{-1}$) | Temp. (° F.) | Viscosity (100 sec$^{-1}$) | Temp. (° F.) | Viscosity (100 sec$^{-1}$) | Temp. (° F.) | Viscosity (100 sec$^{-1}$) | Temp. (° F.) |
| 700 | 73 | 1369 | 74 | 943 | 75 | 675 | 88 |
| 268 | 74 | 347 | 74 | 355 | 75 | 382 | 89 |
| 245 | 105 | 413 | 108 | 456 | 98 | 248 | 130 |
| 176 | 170 | 271 | 178 | 251 | 174 | 279 | 184 |
| 211 | 212 | 242 | 215 | 255 | 211 | 286 | 213 |
| 126 | 226 | 176 | 225 | 193 | 223 | 200 | 226 |
| 68 | 234 | 135 | 231 | 136 | 229 | 135 | 235 |
| 38 | 241 | 111 | 235 | 96 | 234 | 88 | 241 |
| 25 | 246 | 94 | 240 | 60 | 240 | 62 | 247 |
| 24 | 247 | 87 | 244 | 39 | 247 | 55 | 249 |
| 22 | 249 | 85 | 247 | 32 | 249 | 51 | 251 |
| 21 | 250 | 83 | 248 | 29 | 251 | 47 | 252 |
| 20 | 251 | 82 | 250 | 25 | 252 | 46 | 253 |
| | | 81 | 252 | 25 | 253 | 45 | 254 |

The data in Table 2 shows that when 1.8, 3.5 or 5.0 weight percent 4-erucamidopropyl-1,1-dimethyl amine (tertiary amine amide) is added to 4-erucamidopropyl-1,1,1-trimethyl ammonium chloride in isopropanol, the viscosity increases, especially at higher temperatures above 175° F.

The viscosity of material from examples 5, 13 & 15 is determined between 73° F. and 251° F. with a Fann 50 Rheometer equipped with a B5 bob at a shear rate of 100 sec-1 (118 RPM). The results are shown in Table 3.

TABLE 3

| Example 5 | | Example 13 9.0 wt. % tertiary amine amide | | Example 15 10.8 wt. % tertiary amine amide | |
|---|---|---|---|---|---|
| Viscosity (100 sec$^{-1}$) | Temp. (° F.) | Viscosity (100 sec$^{-1}$) | Temp. (° F.) | Viscosity (100 sec$^{-1}$) | Temp. (° F.) |
| 700 | 73 | 849 | 73 | 183 | 73 |
| 268 | 74 | 249 | 74 | 180 | 73 |
| 245 | 105 | 146 | 99 | 114 | 102 |
| 176 | 170 | 221 | 166 | 163 | 173 |
| 211 | 212 | 292 | 208 | 158 | 211 |
| 126 | 226 | 259 | 221 | 148 | 224 |
| 68 | 234 | 217 | 229 | 137 | 230 |
| 38 | 241 | 188 | 234 | 127 | 235 |
| 25 | 246 | 160 | 239 | 116 | 240 |
| 24 | 247 | 141 | 243 | 107 | 244 |
| 22 | 249 | 129 | 247 | 103 | 247 |
| 21 | 250 | 125 | 248 | 101 | 248 |
| 20 | 251 | 118 | 249 | 98 | 249 |
| | | 115 | 251 | 97 | 251 |

The data in Table 3 shows that when 9.0 or 10.8 weight percent 4-erucamidopropyl-1,1-dimethyl amine (tetiary amine amide) is added to 4-erucamidopropyl-1,1,1-trimethyl ammonium chloride in isopropanol, the viscosity increases, especially at higher temperatures above 226° F.

EXAMPLE 16

Viscosified aqueous 4 weight percent 4-erucamidopropyl-1,1,1-trimethyl ammonium chloride, 3.1 weight percent isopropanol, 4.0 weight percent potassium chloride solution A mixture of 72 weight percent 4-erucamidopropyl-1,1,1-trimethyl ammonium chloride in 28 weight percent isopropanol (12.2 g, prepared according to the method of Example 2), additional isopropanol (3.48 g) and water (183.0 g) is blended for 2 minutes. Potassium chloride (8.85 g) and additional water (12.4 g) is added and the contents are blended for 2 more minutes to give the title composition as a viscous solution.

EXAMPLE 17

4-Erucamidopropyl-1,1,1-trimethyl ammonium chloride solution in propylene glycol Erucylalkylamidopropyldimethylamine (574.6 g, 1.48 moles), prepared as in Example 1, is charged to a 2-liter Parr pressure vessel and placed under a water aspirator strip at 100° C. for about 1 hour. The starting material is cooled to 40° C. and 217 g of 1,2-propylene glycol is charged. A reaction temperature of 80° C. is established and the reactor headspace is purged with nitrogen several times before being placed under 5-10 psi nitrogen. Methyl chloride (70.3 g, 1.40 moles) is then added under pressure and the reaction is allowed to proceed at 80-85° C. for 18 hours. After venting the reaction, the total amine value indicated reaction completion. An additional 162 g of 1,2-propylene glycol is then added to the reactor to reach an activity of 62.98 weight percent. Additional, 1,2-propyleneglycol is added to give an activity of 56.2 weight percent.

EXAMPLE 18

Viscosified aqueous 4 weight percent 4-erucamidopropyl-1,1,1-trimethyl ammonium chloride 3.1 weight percent 1,2-propanediol and 4.0 weight percent potassium chloride solution A portion (15.7 g) of the surfactant composition from Example 17 and water (181.7 g) is blended for 2 minutes. Potassium chloride (8.8 g) and additional water (13.9 g) is added and the contents are blended for 2 more minutes to give the title composition as a viscous solution.

The viscosity of material from examples 16 and 18 is determined between 82° F. and 254° F. with a Fann 50 Rheometer equipped with a B5 bob at a shear rate of 100 sec$^{-1}$ (118 RPM). The results are shown in Table 4.

TABLE 4

| Example 16 3 wt. % Isopropanol | | Example 18 3.1 wt. % 1,2-Propyleneglycol | |
|---|---|---|---|
| Viscosity (100 sec$^{-1}$) | Temperature (° F.) | Viscosity (100 sec$^{-1}$) | Temperature (° F.) |
| 893 | 82 | 825 | 83 |
| 567 | 85 | 326 | 89 |
| 519 | 128 | 259 | 131 |
| 317 | 189 | 262 | 184 |
| 153 | 217 | 288 | 217 |
| 85 | 227 | 290 | 228 |
| 71 | 232 | 302 | 235 |
| 64 | 238 | 311 | 241 |
| 60 | 243 | 291 | 245 |
| 58 | 247 | 274 | 247 |
| 57 | 249 | 255 | 249 |
| 57 | 251 | 241 | 251 |
|  |  | 226 | 252 |
|  |  | 206 | 254 |

The Table 4 shows that the viscosity is higher when 4-erucamidopropyl-1,1,1-trimethyl ammonium chloride is in 1,2-propanediol instead of isopropanol, at temperatures above

EXAMPLE 19

4-Erucamidopropyl-1,1,1-trimethyl ammonium chloride

The 4-erucamidopropyl-1,1,1-trimethyl ammonium chloride is prepared by charging 651 lbs of IPA to 4-erucamido-1,1-dimethyl amine, prepared as in Example 1. A total of 199.5 lbs of methyl chloride is then charged to the reactor and allowed to react over a 24 hour period at a temperature up to 206° F. Once the methyl chloride finished reacting, the reactor is cooled and stripped to remove residual methyl chloride. NMR analysis indicates the reactor contents consists of 10.3 weight percent 4-erucamidopropyl-1,1-dimethylamine and 89.7 weight percent 4-erucamidopropyl-1,1,1-trimethyl ammonium chloride. The product is titrated to be 73.0 weight percent actives in isopropyl alcohol.

EXAMPLE 20

Aqueous 52.9 weight percent 4-erucamidopropyl-1,1,1-trimethyl ammonium chloride, 6.1 weight percent 4-erucamidopropyl-1,1-dimethylamine, 26 weight percent isopropanol, 10 weight percent 1,2-propanediol solution A portion (2380 lbs) of the surfactant composition from Example 19, 1,2-propanediol (297 lbs, 135 kg), isopropanol (123 lbs, 56 kg) and water (150 lbs, 68 kg g) are mixed at about 80° C. for 1 hour to give a composition composed of 52.9 weight percent 4-erucamidopropyl-1,1,1-trimethyl ammonium chloride and 6.1 weight percent 4-erucamidopropyl-1,1-dimethylamine, 26 weight percent isopropanol, 10 weight percent 1,2-propanediol and 5 weight percent water.

EXAMPLE 21

Viscosified aqueous 0.265 weight percent 4-erucamidopropyl-1,1-dimethylamine, 2.31 weight percent 4-erucamidopropyl-1,1,1-trimethyl ammonium chloride, 3.75 weight percent KCl solution Potassium chloride (8 g) and water (200 g) are added to a blender vessel. The contents are blended at low speed to solubilize the potassium chloride in the water. 6 Milliliters (5.5 g) of the composition from Example 20 is added to the salt solution and blended to give the title composition.

EXAMPLE 22

Viscosified aqueous 0.265 weight percent 4-erucamidopropyl-1,1-dimethylamine, 2.31 weight percent 4-erucamidopropyl-1,1,1-trimethyl ammonium chloride, 0.28 weight percent MW 1,000,000 sulfonated polystyrene sodium salt, 3.73 weight percent KCl solution Potassium chloride (8.0 g) and water (200.10 g) are added to a blender vessel. The contents are blended at low speed to solubilize the potassium chloride in the water. A portion (6 mL, 5.68 g) of the composition from from Example 20 are added to the salt solution and blended. TL501 (1,000,000 Mw sodium sulfonated polystyrene, available from ALCO Chemical, 0.603 g) is then added and blended to give the title composition. The rheology of the gels from Examples 21 and 22 are determined on a Grace Model 5500 HPHT. The results are shown in Table 5

TABLE 5

| Example 22 | | Example 21 | |
|---|---|---|---|
| Viscosity (100 sec$^{-1}$) | Temperature (° F.) | Viscosity (100 sec$^{-1}$) | Temperature (° F.) |
| 133 | 79 | 77 | 77 |
| 113 | 80 | 65 | 78 |
| 106 | 88 | 65 | 85 |
| 96 | 96 | 66 | 95 |
| 90 | 90 | 68 | 105 |
| 85 | 117 | 75 | 114 |
| 80 | 122 | 73 | 123 |
| 77 | 126 | 75 | 128 |
| 74 | 129 | 77 | 135 |
| 73 | 132 | 80 | 138 |
| 66 | 135 | 74 | 142 |
| 58 | 141 | 65 | 148 |
| 47 | 152 | 57 | 159 |
| 40 | 163 | 45 | 171 |
| 37 | 175 | 39 | 183 |
| 30 | 195 | 27 | 201 |
| 22 | 214 | 19 | 222 |
| 16 | 228 | 13 | 237 |
| 12 | 238 | 7 | 247 |
| 7 | 244 | 4 | 256 |
| 3.5 | 249 | 2.7 | 262 |
| 1.7 | 254 | 2.1 | 266 |
| 0.34 | 258 | 1.93 | 269 |

The data in Table 5 shows that a polymeric acid improves the viscosity performance of 0.265 weight percent 4-erucamidopropyl-1,1-dimethylamine and 2.31 weight percent 4-erucamidopropyl-1,1,1-trimethyl ammonium chloride gelled with 3.7 weight percent KCl between 75 and 125° F.

EXAMPLE 23

Viscosified 0.265 weight percent
4-erucamidopropyl-1,1-dimethylamine, 2.31 weight
percent 4-erucamidopropyl-1,1,1-trimethyl
ammonium chloride, 0.149 weight percent MW
75,000 sodium sulfonated polystyrene, 3.73 weight
percent KCl solution Potassium chloride (8.0 g) and water (200.20) g are added to a blender vessel. The contents are blended at low speed to solubilize the potassium chloride in the water. A portion (6 mL, 5.79 g) of the surfactant composition from Example 20 (5.79 g) is added to the salt solution and blended. VERSA TL-77 (0.32 g, 30% solution of MW 75,000 sodium sulfonated polystyrene, available from ALCO Chemical) is then added and blended until the vortex disappears and the viscosity reaches a maximum to give the title composition.

EXAMPLE 24

Viscosified aqueous 0.265 weight percent
4-erucamidopropyl-1,1-dimethylamine, 2.31 weight
percent 4-erucamidopropyl-1,1,1-trimethyl
ammonium chloride, 0.14 weight percent MW
75,000 polystyrene sulfonic acid, 3.75 weight
percent KCl solution The mixture of 4-Erucamidopropyl-1,1,1-trimethyl ammonium chloride and 4-erucamidopropyl-1,1-dimethylamine from Example 20 (28.29 g) is blended with VERSA TL-71 (1.57 g, 30% solution of Mw 75,000 polystyrene sulfonic acid) by stirring at about 50° C. Potassium chloride (8.0 g) and water (200.20) g are added to a blender vessel. The contents are blended at low speed to solubilize the potassium chloride in the water. 6 Milliliters (5.68 g) of the VERSA TL-71/4-Erucamidopropyl-1,1,1-trimethyl ammonium chloride/4-erucamidopropyl-1,1-dimethylamine mixture is added to the salt solution and blended until the vortex disappears and the viscosity reaches a maximum to give the title composition. The rheology of the gel from Examples 23 and 24 are determined on a Grace Model 5500 HPHT. The results are shown in Table 6.

TABLE 6

| Example 23 | | Example 24 | |
|---|---|---|---|
| Viscosity (100 sec$^{-1}$) | Temperature (° F.) | Viscosity (100 sec$^{-1}$) | Temperature (° F.) |
| 243 | 75 | 288 | 84 |
| 210 | 77 | 257 | 85 |
| 201 | 86 | 252 | 93 |
| 195 | 98 | 241 | 103 |
| 185 | 109 | 223 | 114 |
| 187 | 117 | 216 | 122 |
| 180 | 122 | 202 | 129 |
| 171 | 125 | 194 | 134 |
| 175 | 129 | 176 | 136 |
| 172 | 132 | 164 | 139 |
| 164 | 135 | 146 | 142 |
| 152 | 142 | 129 | 148 |
| 126 | 153 | 104 | 158 |
| 116 | 170 | 80 | 172 |
| 108 | 184 | 56 | 187 |
| 91 | 200 | 41 | 204 |
| 77 | 217 | 26 | 222 |
| 60 | 231 | 15 | 234 |
| 53 | 242 | 8 | 243 |
| 45 | 249 | 3 | 251 |

TABLE 6-continued

| Example 23 | | Example 24 | |
|---|---|---|---|
| Viscosity (100 sec$^{-1}$) | Temperature (° F.) | Viscosity (100 sec$^{-1}$) | Temperature (° F.) |
| 34 | 255 | | |
| 28 | 259 | | |
| 22 | 262 | | |
| 7 | 269 | | |
| 0.64 | 275 | | |

The data in Table 6 shows that polymeric acids improve the viscosity performance 0.265 weight percent 4-erucamidopropyl-1,1-dimethylamine, 2.31 weight percent 4-erucamidopropyl-1,1,1-trimethyl ammonium chloride gelled with 3.7 weight percent KCl between 75 and 234° F.

EXAMPLE 25

Viscosified aqueous 0.265 weight percent
4-erucamidopropyl-1,1-dimethylamine, 2.31 weight
percent 4-erucamidopropyl-1,1,1-trimethyl
ammonium chloride, 0.3815 weight percent Mw
250,000 poly(acrylic acid), 3.72 weight percent
KCL solution Potassium chloride (8.0 g) and water (200.3 g) are added to a blender vessel. The contents are blended at low speed to solubilize the potassium chloride in the water. 6 Milliliters (5.69 g) of the mixture of 4-Erucamidopropyl-1,1,1-trimethyl ammonium chloride and 4-erucamidopropyl-1,1-dimethylamine from Example 20 is added to the salt solution and blended until the vortex disappears and the viscosity reaches a maximum. Mw 250,000 (poly)acrylic acid (35%, 0.8186 g) is then added and blended to give the title composition. The rheology of the gel from Example 25 is determined on a Grace Model 5500 HPHT. The data is shown in Table 7

TABLE 7

| Example 21 | | Example 25 | |
|---|---|---|---|
| Viscosity (100 sec$^{-1}$) | Temperature (° F.) | Viscosity (100 sec$^{-1}$) | Temperature (° F.) |
| 77 | 77 | 160 | 77 |
| 65 | 78 | 135 | 79 |
| 65 | 85 | 129 | 86 |
| 66 | 95 | 127 | 97 |
| 68 | 105 | 121 | 109 |
| 75 | 114 | 117 | 118 |
| 73 | 123 | 115 | 126 |
| 75 | 128 | 113 | 131 |
| 77 | 135 | 112 | 134 |
| 80 | 138 | 108 | 137 |
| 74 | 142 | 99 | 140 |
| 65 | 148 | 83 | 146 |
| 57 | 159 | 66 | 157 |
| 45 | 171 | 49 | 173 |
| 39 | 183 | 31 | 189 |
| 27 | 201 | 20 | 206 |
| 19 | 222 | 12 | 220 |
| 13 | 237 | 5.9 | 231 |
| 7.3 | 248 | 2.4 | 238 |
| 4.1 | 256 | 0.79 | 245 |
| 2.7 | 262 | 0.33 | 255 |
| 1.9 | 272 | | |

The data in Table 7 shows that poly(acrylic acid) improves the viscosity performance of 0.265 weight percent 4-erucamidopropyl-1,1-dimethylamine, 2.31 weight percent 4-erucamidopropyl-1,1,1-trimethyl ammonium chloride gelled with 3.7 weight percent KCl between 75 and 183° F.

EXAMPLE 26

Viscosified aqueous 0.265 weight percent 4-erucamidopropyl-1,1-dimethylamine, 2.31 weight percent 4-erucamidopropyl-1,1,1-trimethyl ammonium chloride, 0.143 weight percent Mw 75,000 polystyrene sulfonic acid, 3.77 weight percent KCl solution A portion (170.54 g) of the surfactant composition from Example 20 is blended with VERSA TL-71 (9.48 g) by stirring at about 50° C. Potassium chloride (8.0 g) and water (200.0 g) are added to a blender vessel. The contents are blended at low speed to solubilize the potassium chloride in the water. A portion (6 mL, 5.78 g) of the VERSA TL-71/ 4-Erucamidopropyl-1,1,1-trimethyl ammonium chloride/4-erucamidopropyl-1,1-dimethylamine mixture is added to the salt solution and blended until the vortex disappears and the viscosity reaches a maximum to give the title composition.

EXAMPLE 27

Mixture of 5.28 weight percent Mw 75,000 polystyrene sulfonic acid in 89.7 weight percent 4-erucamidopropyl-1,1,1-trimethyl ammonium chloride and 10.3 weight percent 4-erucamidopropyl-1,1-dimethylamine A portion (757.8 g) of the surfactant composition from Example 20 is blended with VERSA TL-71 (42.28 g) by stirring at about 50° C. to give 5.28 weight percent VERSA TL-71 in a mixture of 89.7 weight percent 4-erucamidopropyl-1,1,1-trimethyl ammonium chloride and 10.3 weight percent 4-erucamidopropyl-1,1-dimethylamine.

EXAMPLE 28

Viscofied aqueous 0.265 weight percent 4-erucamidopropyl-1,1-dimethylamine, 2.31 weight percent 4-erucamidopropyl-1,1,1-trimethyl ammonium chloride, 0.14 weight percent Mw 75,000 polystyrene sulfonic acid, 3.7 weight percent KCl solution Potassium chloride (8.0 g) and water (202.39 g) are added to a blender vessel. The contents are blended at low speed to solubilize the potassium chloride in the water. A portion (6 mL, 5.78 g) of the surfactant composition from Example 27 is added to the salt solution and blended until the vortex disappears and the viscosity reaches a maximum. The gel is titrated with Aquatreat AR-545 (1.123 g, available from ALCO Chemical, Chattanooga, Tenn.) until the gel breaks. The rheology of the gel from Example 26 and the broken gel (Example 28) is determined on a Grace Model 5500 HPHT. The data are shown in Table 8.

TABLE 8

| Example 26 | | Example 28 | |
|---|---|---|---|
| Viscosity (100 sec$^{-1}$) | Temperature (° F.) | Viscosity (100 sec$^{-1}$) | Temperature (° F.) |
| 264 | 77 | 5.3 | 74 |
| 245 | 78 | 6.3 | 77 |
| 238 | 85 | 5.8 | 87 |
| 230 | 98 | 5.6 | 99 |
| 220 | 110 | 5.5 | 109 |
| 210 | 120 | 5.1 | 116 |
| 191 | 127 | 5.6 | 122 |
| 180 | 132 | 5.0 | 126 |
| 157 | 135 | 4.5 | 129 |
| 146 | 138 | 4.6 | 131 |
| 130 | 141 | 4.0 | 133 |
| 100 | 148 | 4.0 | 138 |
| 83 | 159 | 4.3 | 151 |
| 70 | 173 | 4.4 | 171 |
| 54 | 189 | 4.3 | 187 |
| 35 | 206 | 3.6 | 205 |
| 23 | 224 | 2.9 | 223 |
| 13 | 236 | 2.6 | 243 |
| 6 | 245 | 3.3 | 249 |
| 3 | 251 | 3.1 | 254 |
| 2 | 257 | 2.8 | 257 |
| 1.7 | 261 | 1.1 | 261 |
| 1.5 | 272 | | |

As shown in Table 8, Aquatreat AR-545 completely breaks the viscosity 0.265 weight percent 4-erucamidopropyl-1,1-dimethylamine, 2.31 weight percent 4-erucamidopropyl-1,1,1-trimethyl ammonium chloride, 0.14 weight percent VERSA TL-71 gelled with 3.7 weight percent KCl.

Changes can be made in the composition, operation, and arrangement of the method of the invention described herein without departing from the concept and scope of the invention as defined in the claims.

The invention claimed is:
1. A surfactant composition comprising
   (a) about 25 to about 80 weight percent of a surfactant mixture comprising
      (a1) about 65 to about 99.4 weight percent of one or more quaternized amidoamine surfactants of formula I-IV,

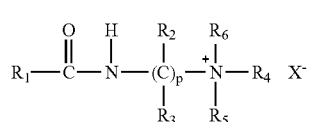

I

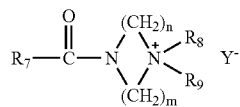

II

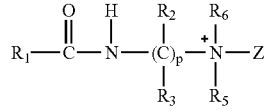

III

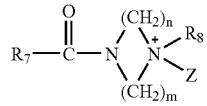

IV wherein $R_1$ and $R_7$ are independently selected from the group consisting of $C_{12}$-$C_{30}$ alkyl, $C_{12}$-$C_{30}$ alkenyl, $C_{12}$-$C_{30}$ arylalkyl and $C_{12}$-$C_{30}$ cycloalkylalkyl; $R_2$ and $R_3$ are independently selected at each occurrence from hydrogen and $C_1$-$C_4$ alkyl; $R_4$, $R_5$, $R_6$, $R_8$ and $R_9$ are independently selected from $C_1$-$C_4$ alkyl, $C_1$-$C_4$ alkoxyalkyl and $C_1$-$C_4$ hydroxyalkyl; X and Y are independently selected from halide, alkyl sulfate and sulfate; p is an integer from 1 to about 10; m and n are independently integers of 1 to about 4; Z is —$CH_2(CH_2)_qCH_2SO_3^-$ or —$CH_2CH(OH)CH_2SO_3^-$; and q is 1 or 2, (a2) about 0.5 to about 20 weight percent of one or more tertiary amine amides of formula V or VI,

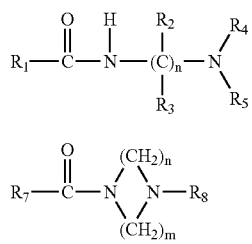

wherein $R_1$, $R_2$, $R_3$, $R_4$, $R_5$, $R_7$, $R_8$, p, m and n are as defined in step (a1) and (a3) about 0.1 to about 15 weight percent of one or more polymeric acids; and (b) about 20 to about 75 weight percent of a solvent system comprising
(b1) about 0 to about 10 weight percent water,
(b2) about 0 to about 45 weight percent of one or more alcohols and
(b3) about 0 to about 45 weight percent of one or more glycols.

2. The surfactant composition of claim 1 wherein the alcohol is isopropanol and the glycol is 1,3-propane diol.

3. The surfactant composition of claim 2 comprising
(a) about 55 to about 65 weight percent of a surfactant mixture comprising
(a1) about 65 to about 99.4 weight percent of the quaternized amidoamine surfactants of formula I-IV, or a combination thereof,
(a2) about 0.5 to about 20 weight percent of the tertiary amine amides of formula V or VI, or a combination thereof and
(a3) about 0.1 to about 15 weight percent of the polymeric acid; and
(b) about 35 to about 45 weight percent of a solvent system comprising
(b1) about 0 to about 10 weight percent water,
(b2) about 0 to about 45 weight percent isopropanol and
(b3) about 0 to about 45 weight percent 1,3-propane diol-.

4. The surfactant composition of claim 3 wherein the solvent system comprises about 0 to about 5 weight percent water, about 20 to about 35 weight percent isopropanol and about 0 to about 35 weight percent 1,3-propane diol.

5. The surfactant composition of claim 3 wherein the solvent system comprises about 3 to about 5 weight percent water, about 20 to about 22 weight percent isopropanol and about 8 to about 12 weight percent 1,3-propane diol.

6. A viscosified aqueous surfactant composition comprising (I) about 1 to about 10 weight percent of a surfactant composition comprising
(a) about 20 to about 75 weight percent of a surfactant mixture comprising
(a1) about 65 to about 99.4 weight percent of one or more quaternized amidoamine surfactants of formula I-IV,

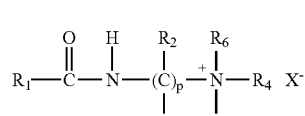

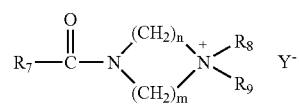

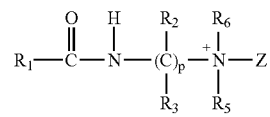

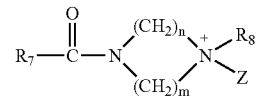

wherein $R_1$ and $R_7$ are independently selected from the group consisting of $C_{12}$-$C_{30}$ alkyl, $C_{12}$-$C_{30}$ alkenyl, $C_{12}$-$C_{30}$ arylalkyl and $C_{12}$-$C_{30}$ cycloalkylalkyl; $R_2$ and $R_3$ are independently selected at each occurrence from hydrogen and $C_1$-$C_4$ alkyl; $R_4$, $R_5$, $R_6$, $R_8$ and $R_9$ are independently selected from $C_1$-$C_4$ alkyl, $C_1$-$C_4$ alkoxyalkyl and $C_1$-$C_4$ hydroxyalkyl; X and Y are independently selected from halide, alkyl sulfate and sulfate; p is an integer from 1 to about 10; m and n are independently integers of 1 to about 4; Z is —$CH_2(CH_2)_qCH_2SO_3^-$ or —$CH_2CH(OH)CH_2SO_3^-$; and q is 1 or 2, (a2) about 0.5 to about 20 weight percent of one or more tertiary amine amides of formula V or VI,

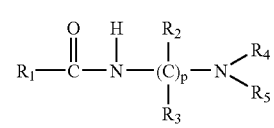

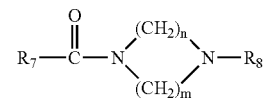

wherein $R_1$, $R_2$, $R_3$, $R_4$, $R_5$, $R_7$, $R_8$, p, m and n are as defined in step (a1) and (a3) about 0.1 to about 15 weight percent of one or more polymeric acids; and (b) about 20 to about 75 weight percent of a solvent system comprising (b1) about 0 to about 10 weight percent water,
(b2) about 0 to about 45 weight percent of one or more alcohols and
(b3) about 0 to about 45 weight percent of one or more glycols;
(II) about 0.4 to about 20 weight percent of one or more electrolytes; and
(III) about 80 to about 98.5 weight percent water.

7. The viscosified aqueous surfactant composition of claim 6 wherein the alcohol is isopropanol and the glycol is 1,3-propane diol.

8. The viscosified aqueous surfactant composition of claim 6 comprising about 0.4 to about 5 weight percent of one or more electrolytes.

9. The viscosilied aqueous surfactant composition of claim 7 comprising
(I) about 1 to about 10 weight percent of a surfactant composition comprising
  (a) about 55 to about 65 weight percent of a surfactant mixture comprising
    (a1) about 65 to about 99.4 weight percent of the quaternized amidoamine surfactants of formula I-IV, or a combination thereof,
    (a2) about 0.5 to about 20 weight percent of the tertiary amine amides of formula V or VI, or a combination thereof and
    (a3) about 0.1 to about 15 weight percent of the polymeric acid; and
  (b) about 35 to about 45 weight percent of a solvent system comprising
    (b1) about 0 to about 10 weight percent water,
    (b2) about 0 to about 45 weight percent of isopropanol and
    (b3) about 0 to about 45 weight percent of one or more 1,3-propane diol and
(II) about 0.4 to about 5 weight percent of one or more electrolytes; and
(III) about 80 to about 98.5 weight percent water.

10. The viscosified aqueous surfactant composition of claim 9 comprising
(I) about 1 to about 10 weight percent of a surfactant composition comprising
  (a) about 55 to about 65 weight percent of a surfactant mixture comprising
    (a1) about 84 to about 96.6 weight percent of the quaternized amidoamine surfactants of formula I-IV, or a combination thereof,
    (a2) about 3 to about 11 weight percent of the tertiary amine amides of formula V or VI, or a combination thereof and
    (a3) about 0.4 to about 5 weight percent of the polymeric acid; and
  (b) about 35 to about 45 weight percent of a solvent system comprising
    (b1) about 0 to about 10 weight percent water,
    (b2) about 0 to about 45 weight percent of isopropanol and
    (b3) about 0 to about 45 weight percent of one or more 1,3-propane diol and
(II) about 1 to about 5 weight percent of one or more electrolytes; and
(III) about 80 to about 98.5 weight percent water.

11. The viscosified aqueous surfactant composition of claim 10 comprising
(I) about 1 to about 10 weight percent of a surfactant composition comprising
  (a) about 55 to about 65 weight percent of a surfactant mixture comprising
    (a1) about 88 to about 92.6 weight percent of the quatemized amidoamine surfactants of formula I-IV, or a combination thereof,
    (a2) about 7 to about 11 weight percent of the tertiary amine amides of formula V or VI, or a combination thereof and
    (a3) about 0.4 to about 2 weight percent of the polymeric acid; and
  (b) about 35 to about 45 weight percent of a solvent system comprising
    (b1) about 0 to about 10 weight percent water,
    (b2) about 0 to about 45 weight percent of isopropanol and
    (b3) about 0 to about 45 weight percent of one or more 1,3-propane diol and
(I) about 1 to about 5 weight percent of one or more electrolytes; and
(III) about 80 to about 98.5 weight percent water.

12. The viscosified aqueous surfactant composition of claim 6 further comprising one or more particulate proppants suspended therein.

13. The viscosified aqueous surfactant composition of claim 6 further comprising one or more breakers.

14. The viscosified aqueous surfactant composition of claim 13 wherein the breaker is a blend of polypropylene glycol, oleic acid and potassium oleate.

15. The viscosified aqueous surfactant composition of claim 13 wherein the breaker is polypropylene glycol.

16. The viscosified aqueous surfactant composition of claim 13 wherein the breaker is a blend of oxone.

17. The viscosified aqueous surfactant composition of claims 13 wherein the breaker is an oxidizer.

18. The viscosified aqueous surfactant composition of claim 17 where the oxidizer is selected from the group consisting of sodium persulfate, sodium perchlorate, ammonium persulfate, potassium perchlorate, sodium permanganate monohydrate or ammonium perchlorate.

19. The viscosified aqueous surfactant composition of claim 13 wherein the breaker is a poly(acrylic acid-2-acrylamido-2-methylpropanesulfonic acid).

20. The viscosified aqueous surfactant composition of claim 13 wherein the breaker is oleic acid.

21. The viscosified aqueous surfactant composition of claim 13 wherein the breaker is selected from the group consisting of sulfonated polystyrene, sulfonated polynapthalene, and sulfonated styrene-maleic anhydride polymers.

22. The viscosified aqueous surfactant composition of claim 13 wherein the breaker is selected from the group consisting of polyacrylic acid, polymethacrylic acid and acrylic acid-methacrylic acid copolymer.

23. The viscosified aqueous surfactant composition of claim 13 wherein the breaker is selected from the group consisting of ethoxylated nonylphenol formaldehyde resins and ethoxylated nonyl and di-nonyl phenol formaldehyde resins.

24. A method of treating a well in a subterranean formation comprising pumping into the well the viscosified aqueous surfactant composition of claim 6.

25. The method of claim 24 wherein the treating is selected from the group consisting of drilling, hydraulic fracturing, gravel placement, scale removing and mud cake removing operations.

26. A method of fracturing a subterranean formation comprising pumping into the formation at a pressure sufficient to fracture the formation the surfactant composition of claim 8.

27. A method of fracturing a subterranean formation comprising pumping into the formation at a pressure sufficient to fracture the formation the viscosified aqueous surfactant composition of claim 6.

28. The surfactant composition of claim 1 wherein the polymeric acids are selected from the group consisting of sulfonated polystyrenes, sulfonated polynaphthalenes, sulfonated styrene-maleic anhydride polymers, polyacrylic acid, polymethacrylic acid and poly acrylic methacrylic acid polymers.

29. The surfactant composition of claim 1 wherein the polymeric acids have a molecular weight of at least about 25,000.

30. The surfactant composition of claim 1 wherein $R_1$ and $R_7$ are independently selected from the group consisting of $C_{15}$-$C_{30}$ alkyl and $C_{12}$-$C_{30}$ alkenyl.

31. The surfactant composition of claim 1 wherein $R_1$ and $R_7$ are independently selected from the group consisting of $C_{15}$-$C_{30}$ alkenyl.

32. The surfactant composition of claim 1 wherein $R_1$ and $R_7$ are independently selected from the group consisting of $C_{18}$-$C_{30}$ alkenyl.

33. The surfactant composition of claim 1 wherein $R_1$ and $R_7$ are independently selected from the group consisting of $C_{22}$-$C_{30}$ alkenyl.

34. The surfactant composition of claim 1 wherein p is an integer of 2 to about 6 and m and n are both 2.

35. The surfactant composition of claim 1 wherein $R_1$ and $R_7$ are independently selected from the group consisting of $C_{18}$-$C_{30}$ alkenyl; $R_2$ and $R_3$ are hydrogen; $R_4$, $R_5$, $R_6$, $R_8$ and $R_9$ are independently selected from $C_1$-$C_2$ alkyl, $C_2$-$C_3$ hydroxyalkyl and $C_6$-$C_8$ arylalkyl; p is 2 or 3; m and n are both 2 and X and Y are independently selected from Cl and $CH_3O$—$SO_2$—$O$—.

36. The surfactant composition of claim 35 wherein $R_6$ and $R_8$ are methyl and $R_4$, $R_5$ and $R_9$ are independently selected from the group consisting of methyl, ethyl and hydroxyethyl.

37. The surfactant composition of claim 36 wherein $R_4$, $R_5$ and $R_9$ are methyl.

38. The surfactant composition of claim 37 wherein p is 2.

39. The surfactant composition of claim 38 wherein the polymeric acid is selected from the group consisting of sulfonated polystyrene and salts thereof and polyacrylic acid and salts thereof.

40. The surfactant composition of claim 39 wherein the sulfonated polystyrene and its salts have a molecular weight of at least about 75,000.

41. The viscosified surfactant composition of claim 6 wherein the electrolytes are selected from the group consisting of organic and inorganic salts of ammonia and alkali or alkaline-earth metals.

* * * * *